United States Patent
Hanckel (10) Patent No.: US 10,756,947 B2
(45) Date of Patent: Aug. 25, 2020

(54) BATCH LOGGING IN A DISTRIBUTED MEMORY

(71) Applicant: ORACLE INTERNATIONAL CORPORATION, Redwood Shores, CA (US)

(72) Inventor: Robert Hanckel, Amherst, NH (US)

(73) Assignee: Oracle International Corporation, Redwood Shores, CA (US)

( * ) Notice: Subject to any disclaimer, the term of this patent is extended or adjusted under 35 U.S.C. 154(b) by 866 days.

(21) Appl. No.: 14/158,994

(22) Filed: Jan. 20, 2014

(65) Prior Publication Data

US 2015/0207855 A1 Jul. 23, 2015

(51) Int. Cl.
*G06F 15/16* (2006.01)
*H04L 12/24* (2006.01)
*H04L 29/08* (2006.01)

(52) U.S. Cl.
CPC ............ *H04L 41/06* (2013.01); *H04L 41/069* (2013.01); *H04L 67/1097* (2013.01)

(58) Field of Classification Search
CPC . H04L 67/288; H04L 67/2814; H04L 47/822; H04L 43/10; H04L 43/08
See application file for complete search history.

(56) References Cited

U.S. PATENT DOCUMENTS

| 8,621,285 | B2 | 12/2013 | Thilagar et al. | |
|---|---|---|---|---|
| 9,104,745 | B1 * | 8/2015 | Gutti | G06F 17/30598 |
| 2003/0005173 | A1 * | 1/2003 | Shah | G06F 11/3476 719/318 |
| 2005/0108292 | A1 * | 5/2005 | Burton | G06F 3/0608 |
| 2007/0083641 | A1 * | 4/2007 | Hu | H04L 41/0681 709/224 |
| 2008/0317026 | A1 * | 12/2008 | Vogl | G06Q 10/06 370/389 |
| 2010/0280630 | A1 * | 11/2010 | Worek | G05B 19/4183 700/15 |
| 2011/0289092 | A1 * | 11/2011 | Kumar | G06F 11/3476 707/741 |
| 2015/0120677 | A1 * | 4/2015 | Arguelles | G06F 7/00 707/687 |

* cited by examiner

*Primary Examiner* — Glenton B Burgess
*Assistant Examiner* — Rachel J Hackenberg
(74) *Attorney, Agent, or Firm* — Kraguljac Law Group, LLC (57) ABSTRACT

Systems, methods, and other embodiments associated with logging event messages in a computing grid using a distributed memory are described. In one embodiment, a method includes storing, in a distributed memory, a batch of log messages received from one of a plurality of handlers. Storing the batch in the distributed memory includes storing the batch in one of a plurality of memories that are part of the distributed memory and storing the batch with a group of batches from the plurality of handlers. The example method may also include generating, after a predefined period of time has elapsed, a formal log from the group of batches. The predefined period of time is an amount of time after a reporting period within which batches from the reporting period are expected to arrive in the distributed memory. The formal log includes sorted messages from the group of batches.

12 Claims, 6 Drawing Sheets

BATCH LOGGING IN A DISTRIBUTED MEMORY

BACKGROUND

Logs are used for understanding what went wrong with a computing system when errors or other fault conditions occur in the computing system. Typical logging behavior includes writing a log message to a local text file immediately after an event occurs in a component (e.g., an application). In general, a location of the text file is specific to each instance of a component. That is, components are often from different vendors and thus store log message text files in different locations in a file system. Consider an environment such as an application cluster. A cluster is a grid of multiple components running among multiple systems that work collectively as a single computing system. Accordingly, each of the multiple components generates log messages that are logged in isolated files as configured by each of the multiple components. Thus, log messages for different components are kept independent of other logging activity in a cluster system.

Furthermore, consider that some clusters run on only a few hosts with components organized into hierarchical relationships. If one component fails, then other dependent components on the same host also fail, thus finding a source of the failure includes identifying a failed host and manually reading just a few log files. However, as a cluster system is scaled out to run on hundreds of hosts, manually seeking and reading log files becomes more difficult. Additionally, components may no longer be strictly hierarchical and instead may communicate and share states with peers. Thus, when one component fails on one host, peer components on other hosts may also fail since distributed components may propagate failures across hosts. As a result, one failure may cause cascading failures throughout the cluster system.

Consequently, if a cluster operates across one hundred hosts, and uses eight components on each host, then there may be at least eight hundred log files that characterize what is occurring in the cluster system. Accordingly, a cause of a failure may not be obvious since relevant log messages are buried in the multiplicity of log files.

Typically, collecting log messages in a cluster system may use centralized logging for all components in the cluster system. However, centralized logging for the cluster system encounters a performance bottleneck because all logging activity is sent to a single host which is responsible for capturing all log activity across a cluster and writing the logs to a disk. This bottleneck is exacerbated when the cluster system is in a failure state and generates a lot of logging activity.

As a result, errors in a cluster system caused by one faulty component can create significant difficulties. For example, administrators have to spend enormous amounts of time finding "Patient Zero" (i.e. the failing component that created the error state in the cluster). A postmortem typically requires administrators to physically view log files for all relevant components and correlate them by time manually. Thus, diagnosing problems is a complex and time consuming task. Collecting and interpreting so many logs manually is prone to errors where, for example, the wrong logs are collected and relevant information is missing.

Additionally, cluster administrators typically file bug reports to vendors by bundling many logs together with very little accompanying information. The vendor is then tasked to find "Patient Zero" with even less context about the failed cluster system.

The time spent between gathering logs, communicating the logs as bugs to vendors, and reiterating the process when vendors ask for more or missing information causes a turn-around time for understanding the difficulty and offering a solution to be very slow. This difficulty is only growing worse with the advent of cloud technology. For example, clusters may run in a cloud environment, which is elastic and where hosts serving the cluster are transient. That is, clouds are dynamic environments where a number of hosts at any given time may change. Accordingly, cluster administrators also need to know what systems were running at any given point in time, which further complicates logging activities.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein for logging event messages using a distributed memory. Consider that using a distributed memory to store log messages avoids bottlenecks and other difficulties encountered with centralized logging. For example, in one embodiment, the distributed memory is spread across several host systems. Thus, multiple connection paths exist to handle communications between the distributed memory and the logging handlers since the distributed memory is spread across multiple hosts. Accordingly, the logging handlers distributed throughout a cluster can provide log messages to different hosts that together form the distributed memory. In this way, bottlenecks and other difficulties associated with centralized logging are avoided.

Figure 1:
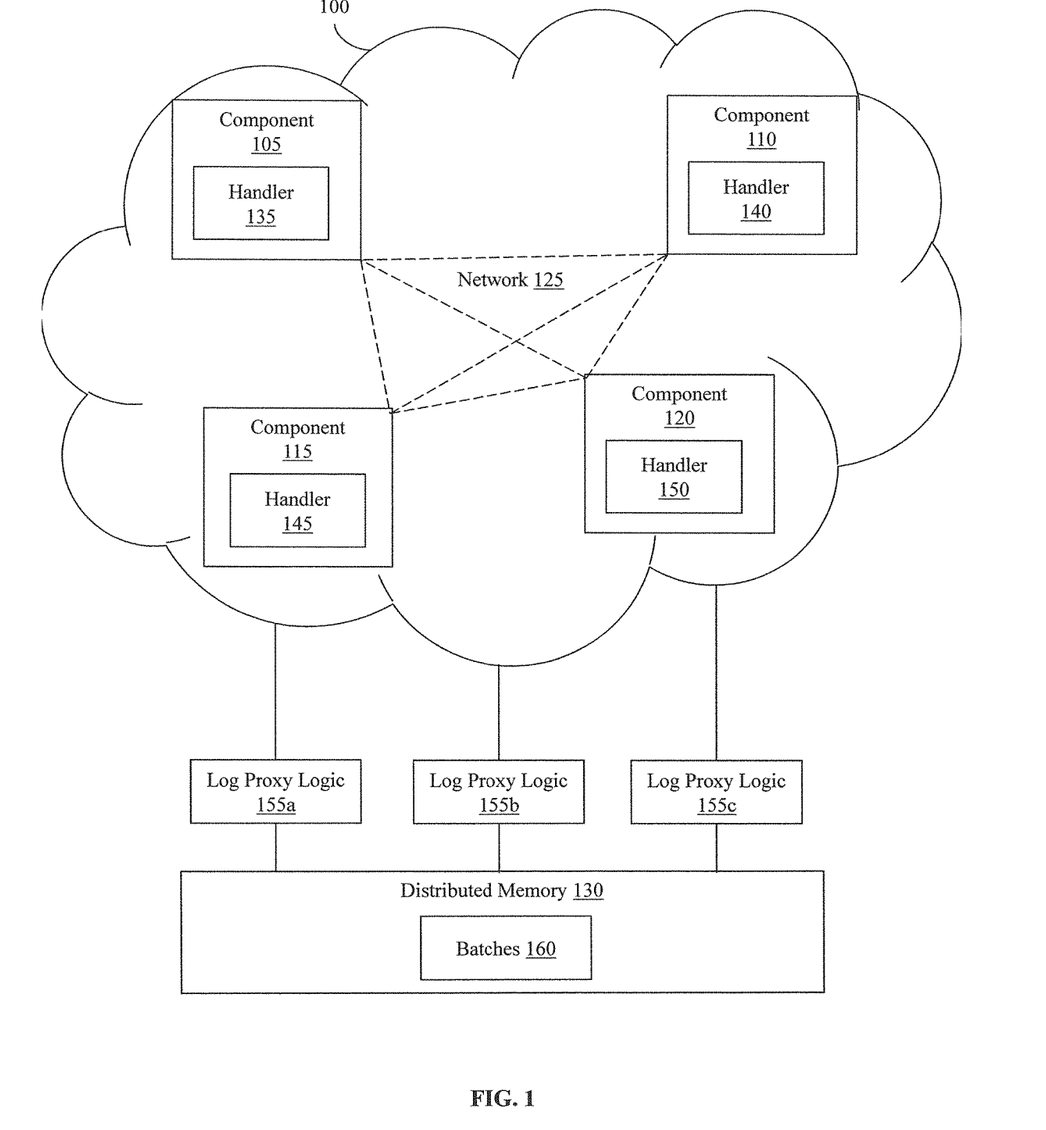
FIG. 1 illustrates one embodiment of a computing cluster with a distributed memory for logging activity.

With reference to FIG. 1, consider a computing environment of a computing cluster 100. The computing cluster 100 is, for example, a computing grid that is composed of many different components spread across different host devices. The computing cluster 100 is, for example, a cloud computing environment that is composed of a plurality of components. In FIG. 1, the computing cluster 100 includes components 105, 110, 115, and 120 (hereinafter collectively referred to as components 105-120). The components 105-120 may each reside within a different host device, or may co-exist in various combinations among one or more host devices. However, for purposes of this disclosure each of the components 105-120 will be discussed as residing in different host devices distributed within a network 125.

In general, the components 105-120 are, for example, a set of processes that are loosely related but together execute in parallel to perform one or more computing tasks. Additionally, the plurality of hosts are, for example, computing devices on which one or more components operate to execute processes in the computing cluster 100. In one embodiment, each of the plurality of hosts is a server or other computing device that is configured to execute one or more processes (e.g., components).

Further consider that the plurality of hosts and the plurality of components (e.g., 105-120) in the computing cluster 100 are dynamic in that hosts that include additional components may be added or removed from the computing cluster 100 on-the-fly during operation. In this way, the computing cluster 100 is scalable to dynamically account for changes in a processing load.

Furthermore, the components 105-120 are distributed within the network 125 among the plurality of hosts. Thus, the network 125 carries communications between the components 105-120 and/or carries communications between the components 105-120 and a distributed memory 130. In one embodiment, the network 125 is the Internet, a local area network (LAN), a wide area network (WAN), a wireless network, a cellular network, combinations of various types of networks, and so on.

Consider that each of the components 105-120 is susceptible to failure, errors, or other conditions and may also generate other generic events that are to be logged. Accordingly, along with each of the components 105-120 is a respective handler 135, 140, 145, and 150 (hereinafter collectively referred to as handlers 135-150).

The plurality of handlers 135-150 log/record activity associated with respective components 105-120. The handlers 135-150 are, for example, log handlers (e.g., extensible plug-ins to Java Utility Logger (JUL) framework), log appliance tailers (LATS) that are a mechanism for obtaining log messages from an operating system, log appenders (e.g., extensible plug-ins to Apache Log4j framework), or another logging utility that captures log messages. In general, the LATS are standalone utilities that tail or track new log entries of a log file being written by non-Java processes (e.g., system log files of an operating system). In particular, LATS track, capture and structure new log entries to ensure they conform to JUL or Log4j standards and can be sent to the logging system. In one embodiment, the handlers 135-150 are individual processes or threads that intercept messages produced by a respective separate component.

Additionally, the handlers 135-150 are separate from a system logging process of an associated host. For example, consider the component 105 and the associated handler 135. During operation of the component 105 various events (e.g., errors, security threats, conditions, and so on) occur that are to be logged. In one embodiment, when one of these events occurs, the handler 135 intercepts a log message generated by the component 105 and stores the log message in a buffer for later transmission to the distributed memory 130. Additionally, because the handlers 135-150 are separate from respective components 105-120, when an error or failure occurs in a component the associated handler remains viable for long enough to collect log messages and, in one embodiment, transmit the log messages.

In general, a handler may periodically communicate collected log messages in a batch to one of a pool of listeners. In one embodiment, the pool of listeners are log proxy logic 155a, 155b, or 155c (hereinafter collectively referred to as log proxy logic 155a-c). The log proxy logic 155a-c are configured to communicate with the handlers 135-150 to store batches 160 in the distributed memory 130. In one embodiment, the log proxy logic 155a-c communicate with the handlers 135-150 using an active protocol. That is, the log proxy logic 155a-c and the handlers 135-150 may actively communicate with each other to exchange information such as, configuration information, heartbeat communications, and/or log messages. Additionally, as used within this disclosure log messages may be referred to as messages, event messages, and/or log messages.

Now, consider that the log proxy logic 155a may communicate with the handler 145, the log proxy logic 155b may communicate with the handlers 135 and 140, and the log proxy logic 155c may communicate with the handler 150. This distributed communication involving multiple connections is in contrast to a typical centralized logging system where communications to store log messages are bottlenecked at a single logging device. Instead, the log proxy logics 155a-c provide access to the distributed memory 130 in a decentralized manner, since batches of log messages may be received and processed by any one of the plurality of the log proxy logics 155a-c. Furthermore, while three log proxy logics 155a-c are illustrated, of course, in other embodiments, fewer or more log proxy logics may be implemented.

Similar to the components 105-120 and the handlers 135-150, consider that, in one embodiment, the log proxy logics 155a-c are dynamically scalable. For example, each of the log proxy logic 155a-c resides on a host device. Thus, according to predefined criteria host devices may be added or removed along with log proxy logic in order to scale a number of log proxy logic to a current condition (e.g., higher or lower message load).

Figure 2:
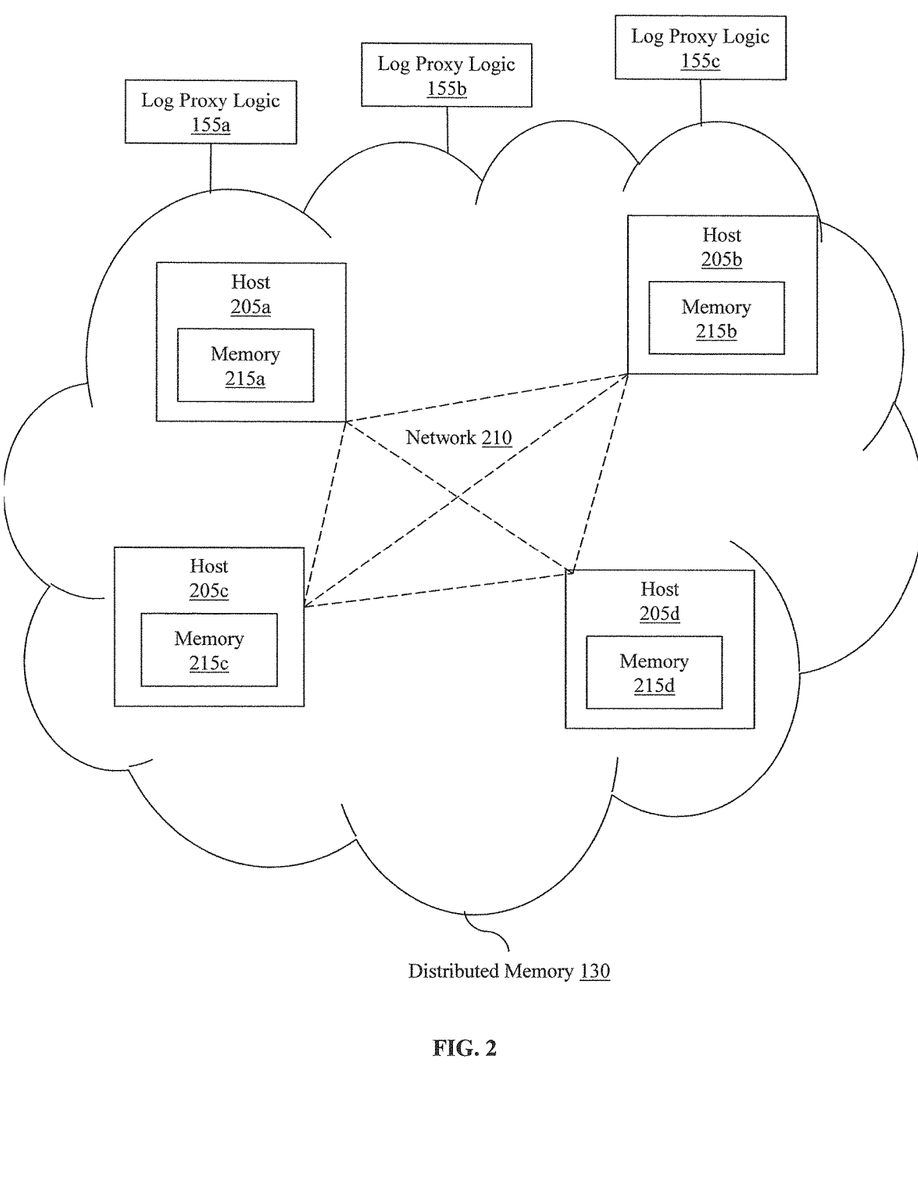
FIG. 2 illustrates one embodiment of a distributed memory associated with logging activity in a computing cluster.

Further details of the distributed memory 130 and storing log messages will be discussed with reference to FIG. 2. FIG. 2 illustrates one embodiment of the distributed memory 130 along with the log proxy logic 155a-c, which provide communications between the handlers 135-150 and the distributed memory 130.

FIG. 2 illustrates an example of a basic composition of the distributed memory 130. That is, for example, the distributed memory 130 is not contained within a single device as are many memories. Instead, the distributed memory 130 comprises a plurality of hosts 205a, 205b, 205c, and 205d (hereinafter collectively referred to as hosts 205a-d). Each of the hosts 205a-d is, for example, a separate device such as a separate server or other computer. The plurality of hosts 205a-d communicate among each other and with the log proxy logic 155a-c using a network 210. The network 210 is, for example, a local area network (LAN) or similar network that provides for carrying communications between devices.

Furthermore, each of the hosts 205a-d include a respective memory 215a, 215b, 215c, and 215d (hereinafter collectively referred to as memories 215a-d). In one embodiment, the memories 215a-d are working volatile memories of the hosts 205a-d, such as, random access memory or another low-latency memory used for caching log messages. Thus, together the memories 215a-d form the distributed memory 130. In this way, difficulties (e.g., bottlenecks)

associated with a centralized single memory for storing log messages are avoided since each of the memories 215a-d is separately accessible.

In addition to avoiding difficulties with bottlenecks, the distributed memory 130 is also scalable. That is, memory may be added to or removed from the distributed memory 130 dynamically according to a current demand. For example, if an error condition occurs in the cluster computing system 100 from FIG. 1 that causes an influx of additional log messages, then additional hosts with additional memory are added to the distributed memory 130 on-the-fly. Similarly, if the distributed memory 130 is under-utilized and includes an excess of free memory space, then one or more hosts may be removed from the distributed memory 130. In this way, the distributed memory 130 dynamically changes to account for current conditions in the computing cluster 100.

Figure 3:
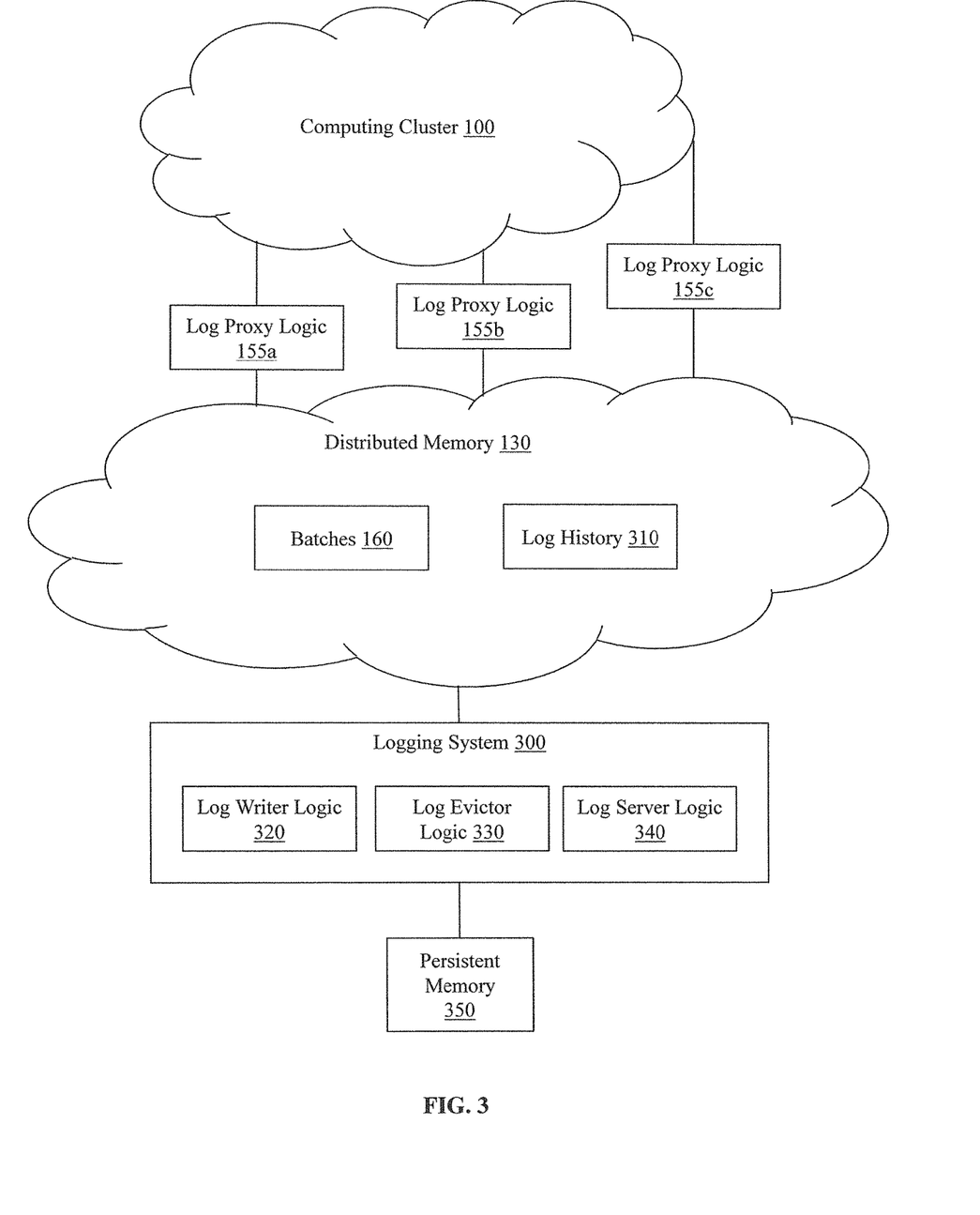
FIG. 3 illustrates one embodiment of a logging system associated with a computing cluster.

FIG. 3 illustrates further aspects of the distributed memory 130 and the computing cluster 100 along with additional aspects of a logging system 300. In one embodiment, the logging system 300 is a scalable logging appliance that manages logging activity and the batches 160 in the distributed memory 130. That is, for example, the logging system 300 controls how the batches are stored and formatted into a log history 310.

In one embodiment, the logging system 300 includes log writer logic 320, log evictor logic 330, and log server logic 340. It should be appreciated that while the logging system 300 is illustrated as a discrete element that is separate from the distributed memory 130 and the log proxy logic 150a-c, in one embodiment, the distributed memory 130 and the log proxy logic 155a-c are also part of the logging system 300. For example, the logging system 300 may also be a scalable system that is composed of a plurality of hosts that each include one or more components of the logging system 300.

Additionally, for example, the log server logic 340 may be included with each instance of the memories 215a-d as shown in FIG. 2 and may not reside in a single central location. Accordingly, whenever the distributed memory 130 is dynamically scaled-out to include additional hosts, another instance of the log sever logic 340 is generated and resides with each of the additional hosts to, for example, control storage of log messages. Similarly, the log evictor logic 330 and the log writer logic 320, while illustrated as residing in the logging system 300 are, in one embodiment, co-located with hosts that form the distributed memory 130, may reside on independent host devices, and so on.

In general, the logging system 300 and associated components (e.g., the distributed memory 130, the computing cluster 100, etc.) are part of a computing grid within which components are dynamically scalable to account for processing demands. Thus, while the logging system 300 is illustrated as a discrete component separate from other components (e.g., the distributed memory 130 and the log proxy logic 155), in one embodiment, the logging system 300 includes multiple host devices that may be distributed.

In either case, the logging system 300 is configured to manage log messages received from the computing cluster 100. For example, the proxy logic 155a-c are configured to store batches of log messages 160 received from a plurality of handlers in the distributed memory 130. Each of the batches 160 includes log messages logged by one of the plurality of handlers 135-150 of FIG. 1. In general, the log proxy logic 155a-c relay communications between a plurality of handlers in the computing cluster 100 and the distributed memory 130.

Additionally, the log proxy logic 155a-c are configured to track the plurality of handlers by, for example, monitoring when batches are received. Each of the log proxy logic 155a-c are responsible for a subset of the plurality of handlers. As an example, consider the log handler 135 from FIG. 1. When the component 105 and the log handler 135 are first initiated in the computing cluster 100, the log handler 135 automatically registers with one of the log proxy logic 155a-c. Thereafter, the one log proxy logic 155a-c to which the log handler 135 registered will subsequently handle all communications between the log handler 135 and the distributed memory 130.

Continuing with the previous example, the log handler 135 collects event messages as they are generated by the component 105. However, the log handler 105 does not immediately communicate each individual log message to the log proxy logic 155a. Instead, the log handler 135 is configured to collect the log messages in batches. In one embodiment, the log handler 135 is configured to communicate a new batch of event messages at regular predefined intervals of time to the log proxy logic 155a as a heartbeat communication. Additionally, in one embodiment, the log handler 135 is configured to communicate an empty batch (i.e., a message without any log messages) at the regular predefined interval if no log messages have been collected. In this way, the log proxy logic 155a uses the batches of event messages (empty or with log messages) to track whether the component 105 and the log handler 135 are still active.

For example, if a batch for a reporting period x is not received by the log proxy logic 155a within a predefined period of time after the reporting period, then, in one embodiment, the log proxy logic 155a may assume that the component 105 is nonresponsive and thus is in a failure state. In general, the reporting period is a periodic interval at which a batch of event messages is collected and sent to the distributed memory 130 via the log proxy logic 155a-c. The predefined period of time is an amount of time that is configured to account for transit time and, for example, other delays (e.g., processing delays). In this way, the log handler 135 is given an amount of leeway to provide the batch as the heartbeat communication and the log handler 135 isn't automatically discounted if the batch is late.

Further consider that the log proxy logic 155a is configured to control all communications between the handler 135 and the distributed memory 130. For example, the log proxy logic 155a-c relay the batches received from the computing cluster 100 (e.g., the plurality of handlers) to the distributed memory 130. In one embodiment, the log proxy logic 155a-c control where batches are stored by, for example, selecting a memory in the distributed memory 130 in which to store batches. In another embodiment, the log server logic 340 is configured to control the log proxy logic 155a-c to store batches in specific memories. For example, the log server logic 340 may perform load balancing by controlling the log proxy logic 155a-c to spread batches among different memories in the distributed memory 130. In general, for example, the batches of log messages are un-batched when received and are dispersed between different memories of the distributed memory 130. Thus, in one embodiment, a log messages from a batch may not be stored together as a single unit, but are instead distributed across various memories in the distributed memory 130.

In either case, the batches 160 are initially stored in the distributed memory 130 in an unordered state. That is, consider that the log proxy logic 155a-c receive batches at each reporting period (e.g., every 15 minutes) for the plurality of handlers in the computing cluster 100. Further consider that each of the batches includes a plurality of log messages collected from different times and that some of the batches may be received after a delay.

Additionally, each of the plurality of handlers may have a slightly different system clock that can further contribute to an unknown order of log messages. Thus, log messages in the batches are initially marked as being unordered since an exact ordering for the log messages is unknown.

However, the log writer logic 320 is configured to generate a formal log from the unordered batches stored in the distributed memory 130. For example, in one embodiment, the log writer logic 320 collates and sorts the unordered messages based, at least in part, on a universal timestamp for each of the messages. In one embodiment, the universal timestamp is a Lamport timestamp or other timestamp that facilitates at least partially ordering the log messages. In this way, the log messages are, for example, ordered even if an exact order is unknown. That is, if a first handler and a second handler are not synchronized and there is no explicit manner of ordering the log messages, then the universal timestamp is used to provide an approximation so that a functional partial ordering of the log messages can be achieved.

Furthermore, the log writer logic 320 is configured to assign a unique identifier to each of the messages in the formal log. The unique identifier streamlines accessing the log messages in the formal log since each event message can be individually referenced using the unique identifier. Accordingly, the log writer logic 320 generates the formal log from the batches 160 of log messages and writes the formal log back into the distributed memory 130. Additionally, the log writer logic 320 periodically generates a new formal log from batches of event messages in the distributed memory 130.

Consider that the distributed memory 130 is continuously receiving new batches after each subsequent reporting period. Thus, in one embodiment, the log writer logic 320 generates a formal log from one or more reporting periods of the batches 160. Additionally, the log writer logic 320 generates the formal log after waiting a predefined period of time to account for delays in receiving the batches 160 from the plurality of log handlers. In this way, the log writer logic 320 can ensure that all available batches from one or more reporting periods are available in the distributed memory 130 before generating the formal log.

Additionally, after the formal log is generated, the log writer logic 320 appends the formal log to a previous formal log that is stored in the distributed memory 130. In this way, a log history 310 of event messages are stored in the distributed memory 130 for use in analyzing errors and other conditions associated with the computing cluster 100.

Further consider that in addition to maintaining the log history 310 in the distributed memory 130, the log writer logic 320 is configured to write the formal log to a persistent memory 350 after the formal log has been generated. The persistent memory 350 is, for example, a non-volatile memory that is used for long term storage of the formal log (e.g., a flat text file). In one embodiment, the formal log is written into a database or other data structure (e.g., Hadoop format) for use by another application.

The log history 310 includes the formal log and one or more previous formal logs. Thus, as new formal logs are appended to the log history 310 a size of the log history 310 grows. While the distributed memory 130 is scalable and can be dynamically scaled to provide additional memory, log messages in the log history 310 become less relevant to analyzing a current state of the computing cluster 100 as they get older.

Accordingly, the log evictor logic 330 periodically deletes messages from the log history 310 according to preset criteria. In one embodiment, a preset criterion mandates that messages be deleted from the log history 310 when the log history 310 reaches a certain size. Alternatively, the preset criterion may mandate that messages older than a certain time be deleted. In either case, the log evictor logic 330 is configured to, for example, delete oldest messages first until the log history 310 is within an acceptable size range. In this way, the most recent messages are maintained in the log history 310 in an ordered state to provide various applications streamlined access to the log history 310.

Additionally, a period of time for which messages are maintained in the log history 310 is, for example, configurable depending on a specific implementation. In one embodiment, the period of time that messages are maintained in the log history 310 is dynamically configurable. For example, the distributed memory 130 may be scaled to support storage of additional messages as time progresses so that messages are not evicted from the distributed memory 130.

In general, the log server logic 340 is configured to dynamically modify the distributed memory 130. For example, the log server logic 340 may change a size of the distributed memory 130 in response to a current storage load of either incoming batches 160 or additional formal logs in the log history 310. In general, the current storage load includes an amount of data being stored and an amount of data that is being received for storage. Thus, when the current storage load exceeds a threshold criterion then the log server logic 340 dynamically modifies the distributed memory 130 by adding additional hosts to expand the distributed memory 130.

Figure 4:
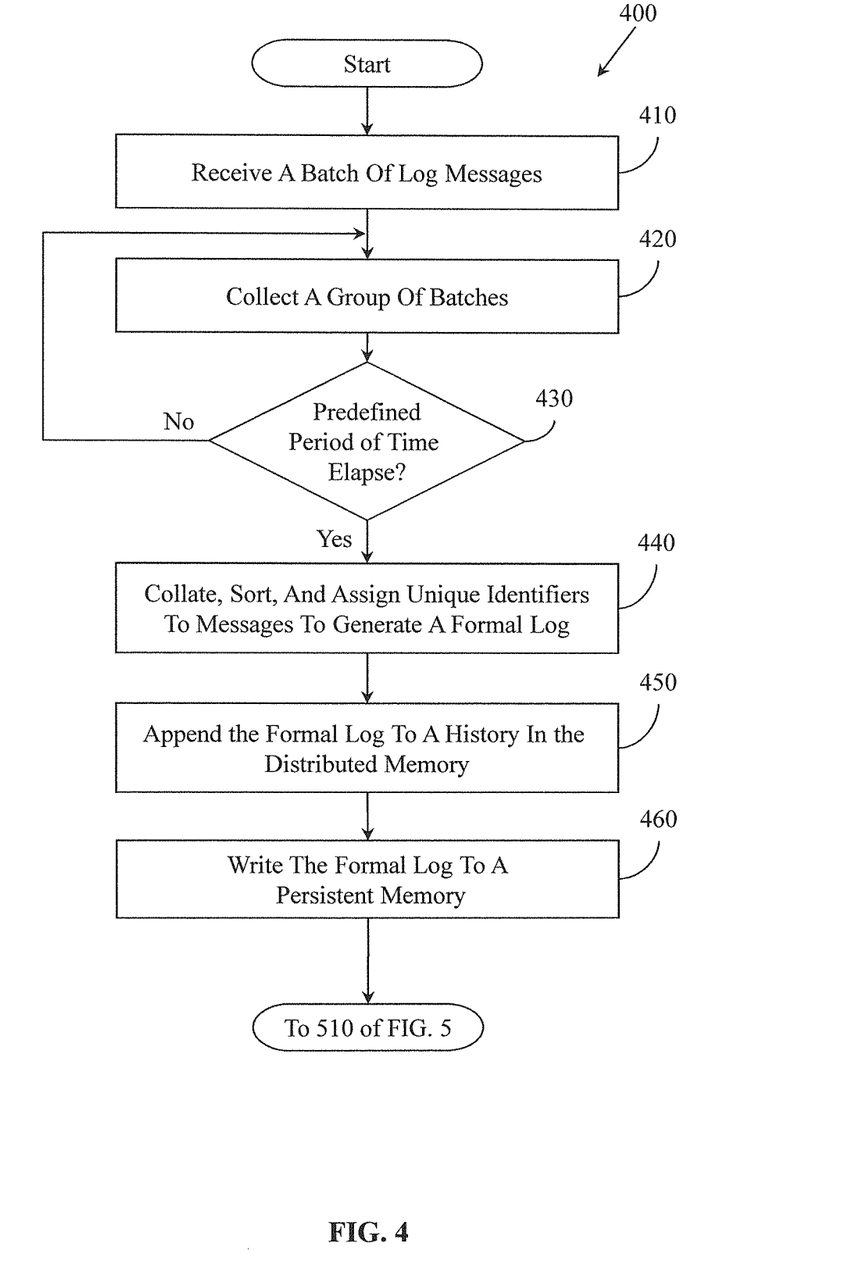
FIG. 4 illustrates an embodiment of a method associated with logging activity in a computing cluster using a distributed memory.
Figure 5:
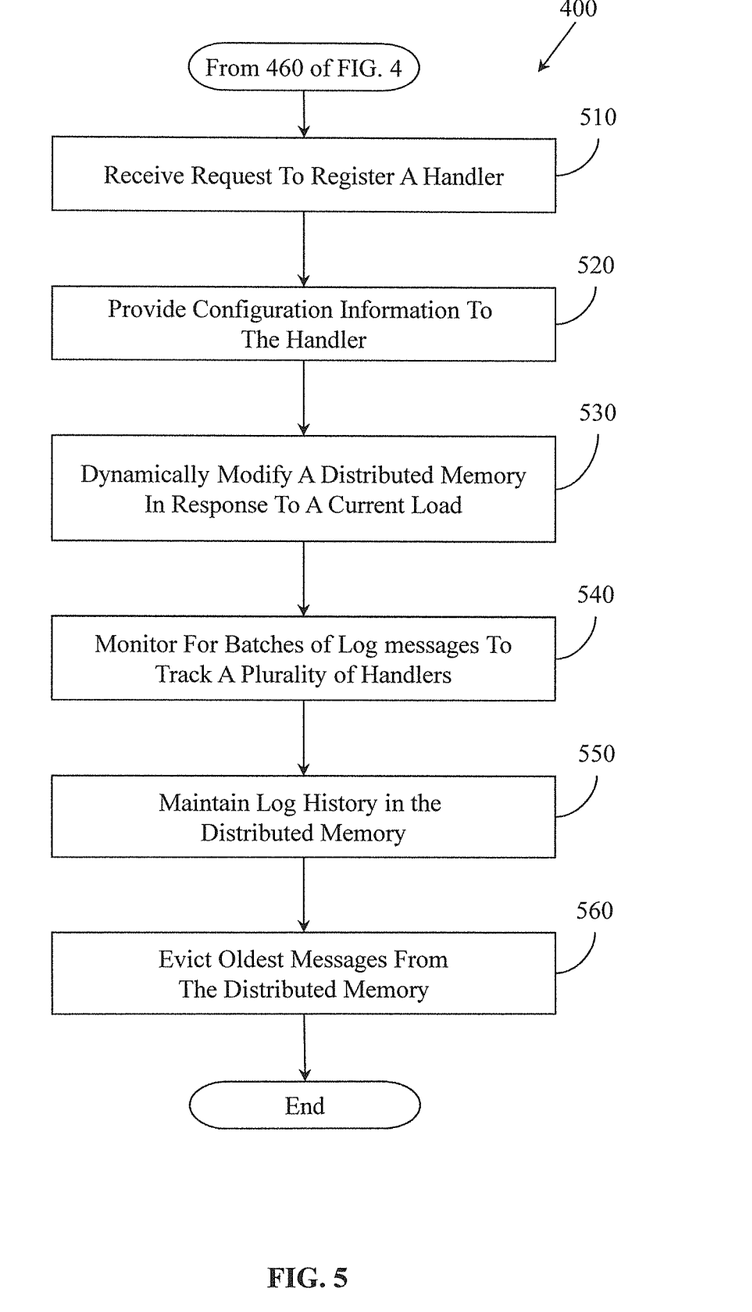
FIG. 5 illustrates one embodiment of a method associated with logging activity in a computing cluster using a distributed memory.

Further aspects of storing log messages in a distributed memory will be discussed with reference to FIGS. 4-5. FIGS. 4-5 illustrate a method 400 associated with storing and maintaining log messages in a distributed memory. The method 400 illustrated in FIGS. 4-5 will be discussed from the perspective the logging system 300 of FIG. 3.

At 410, one or more batches of log messages are received in the distributed memory 130 from one or more of a plurality of handlers in the computing cluster 100. In one embodiment, a batch is a set of log messages from one of the plurality of handlers in the computing cluster 100. Furthermore, each of the log messages in a batch includes, for example, a local timestamp, a message about an event being logged by an associated component, and/or a uniform resource locator (URL) that includes additional information. For example, the URL may include an identifier of an originating handler, a component identifier/location, a name of an associated application, a host name where the component is running, a process identifier (PID) for identifying a process in the host where the component resides, and so on.

The batches are provided to the distributed memory 130 via the log proxy logics 155*a-c*. In general, the distributed memory 130 receives batches from each of the plurality of handlers at the end of every reporting period. The reporting period is, for example, a regular interval of time during which log messages are collected in a buffer at each of the plurality of handlers. At the end of each reporting period, the log messages collected during the reporting period are gathered and communicated to the distributed memory 130 for storage.

As an example, consider that a reporting period for the plurality of handlers may be every 10 seconds. Thus, at the end of each 10 second interval, each of the plurality of handlers gathers log messages collected since a previous reporting period into a batch. Each batch is then sent to one of the log proxy logic 155a-c for storage in the distributed memory 130. In this way, a number of communications to the log proxy logic 155a-c is reduced since communications are not sent for every log message, but instead only for batches of log messages.

At 420, the batches received from the plurality of handlers are stored and collected in the distributed memory 130. In one embodiment, the batches are stored in the distributed memory 130 in an unordered state. That is, the batches are simply stored in the distributed memory 130 without being formatted and are collected in this manner until a predefined period of time elapses as determined at 430.

At 430, the logging system 300 determines whether a predefined period of time (e.g., 15 minutes) has elapsed for receiving a group of batches. In one embodiment, the group of batches includes, for example, batches from one or more reporting periods for the plurality of handlers. That is, batches from multiple reporting periods may be collected in the distributed memory 130 before the batches 160 are formatted into a formal log at 440 and persisted to storage.

Additionally, in one embodiment, the predefined period of time is an amount of time that may include multiple reporting periods and additional time after the reporting periods end within which batches from the plurality of handlers are expected to arrive in the distributed memory 130. Accordingly, the predefined period of time is configured to account for time skews in receiving batches from the plurality of handlers. In this way, the logging system 300 accounts for delays in processing/communications and can ensure that available batches are present in the distributed memory 130 prior to generating a formal log at 440.

For example, if a batch that is expected from a handler for a reporting period is not received within the predefined period of time, then an associated handler and component may be deemed to be in a failure state or encountering another difficulty. Accordingly, in one embodiment, the batches (e.g., regular or empty) also serve as heartbeat communications from the plurality of handlers so that the logging system 300 can track a current state of each component in the computing cluster 100. Additional aspects of the heartbeat communications will be subsequently discussed with respect to block 540.

After the predefined period of time elapses as determined at 430, the batches 160 are formatted into a formal log, at 440. In general, formatting the group of batches involves generally ordering the log messages by collating, sorting, and formatting log messages into a common ordered formatted (e.g., XML). In one embodiment, the log messages are ordered according to a universal timestamp (e.g., Lamport timestamp) that provides for ordering the event messages even though a local timestamp for each message may not be synchronized.

That is, timestamps for various log messages may not be synchronized to the same time since different batches originate from disparate hosts that are distributed in the computing cluster 100. Thus, each host may generate timestamps using a local clock that is somewhat different than other local clocks on other hosts. Accordingly, in one embodiment, the universal timestamp is used in order to provide a general ordering to the event messages without attempting to resolve differences in local clocks and local timestamps.

Once the log messages are ordered and are generally formatted, a unique identifier is assigned to each of the event messages. The unique identifier is, for example, a persistent identifier that includes a unique positive integer. In one embodiment, the unique positive integer reflects a partial ordering according to the universal timestamp. That is, the unique positive integer orders the messages as close to a true ordering as is practical considering that local timestamps are inaccurate and that two or more messages may have identical local timestamps yet the messages must still be ordered. In general, a unique identifier is assigned to each of the messages so that each message may be uniquely referenced and reviewed.

At 450, the formal log generated at 440 is appended to a log history (e.g., log history 310 that is stored in the distributed memory 130). Thus, the log messages of the formal log are maintained in the distributed memory 130 along with log messages from previous formal logs. Additional aspects of maintaining the log history 310 will be discussed subsequently with reference to block 550.

At 460, the formal log generated from the group of batches is written to a persistent memory 350. In one embodiment, the formal log is persisted to memory immediately after being formatted at 440. The formal log may be written to a disk drive, a non-volatile memory (e.g., flash memory), a read-only memory, a tape drive, and so on. In general, the formal log is written to the persistent memory 350 for purposes of long term storage, which may be subsequently used by support personnel. Additionally, in one embodiment, the formal log may be written to an application programming interface data structure or separate file system for use by another application. For example, the formal log may be written to an Apache Hadoop distributed file system (HDFS) or another application specific format. In either case, at 460, the formal log is provided to one or more data stores/data structures.

While blocks 410-460 have been illustrated and discussed in a serial manner, of course, in some circumstances blocks 410-460 may occur in parallel or in a different order than shown. For example, while blocks 410-430 have been illustrated as occurring prior to blocks 440-460, blocks 440-460 may occur in parallel with 410-430 but for separate groups of batches.

Continuing with method 400 to FIG. 5, additional blocks 510-570 are illustrated. Blocks 510-570 are, in general, blocks that do not occur in a specific order, but instead may occur at anytime during operation of method 400, continuously during operation of method 400, or in response to one or more events.

At 510, a new handler in the computing cluster 100 of FIG. 3 provides a request to join the logging system 300. Consider that the computing cluster 100 is a dynamic computing environment in which components are often added and removed depending on current processing trends. Consequently, along with new components being added or old components being removed, handlers are also added and removed from the plurality of handlers. Thus, when a new handler is added along with a new component or operating system, the new handler registers with the logging system 300.

In one embodiment, the plurality of handlers may also include log appliance tailers (LATS). Each of the LATS captures streams of log messages from an operating system of an associated host. Thus, while the handlers capture log messages from various components operating on a host, the LATS capture log messages from operating systems that execute one or more components. Accordingly, the LATS capture operating system specific log messages, such as, resource problems and other OS log messages. In this way, log messages that would not be captured by a handler for a component but may provide useful information about operation of the component can also be logged.

Continuing with the discussion of new handlers, the new handler registers, for example, by providing a request to one of the log proxy logics 155*a-c*. For example, the new handler may select one of the log proxy logics 155*a-c* to communicate with according to a load-balance algorithm. The new handler uses the load-balance algorithm to determine which of the log proxy logics 155*a-c* is accepting new connections and the new handler then proceeds to connect to one of the log proxy logics 155*a-c*. Alternatively, the new handler may send a message to one of the log proxy logics 155*a-c* and be redirected based on a load balancing determination by the log proxy logics 155*a-c* or the server logic 340. In either case, the new handler and the plurality of handlers communicate with the log proxy logics 155*a-c* when communicating with the logging system 300.

At 520, in response to the new handler requesting to join the logging system 300, the new handler is added to the logging system 300 and a configuration message may be sent back to the new handler. The configuration message includes, for example, information about reporting periods, synchronization information, and other information that is used by the new handler when operating within the logging system 300.

At 530, a size of the distributed memory 130 is modified in response to a current storage load. As previously mentioned, the distributed memory 130 is a volatile memory that caches the log messages in order to provide low-latency access to the log messages. In one embodiment, the distributed memory 130 includes a plurality of distributed memories hosted on separate distributed devices. According to how much storage is currently needed, or will soon be needed, a number of hosts fluctuates. That is, the distributed memory is a cloud that contracts and expands according to a current storage load as controlled by the logging system 300. In this way, the distributed memory 130 is dynamically scalable to handle changing storage needs.

At 540, the plurality of handlers are tracked by monitoring when each batch in the group of batches arrives in the distributed memory 130. Consider that, as discussed previously, each handler provides a batch of log messages at the end of each reporting period. Thus, each batch that a handler sends to one of the log proxy logics 155*a-c* can be used as a heartbeat communication to determine whether the handler is, for example, still active. Consequently, the log proxy logics 155*a-c* monitor for batch communications in order to track a current status of each handler and each associated component.

At 550, the formal log and the log history 310 are maintained in the distributed memory 130 to provide access to the log messages in a sorted format. By keeping the formal log and previous formal logs in the distributed memory 130 in the form of the log history 310, access to the log messages is maintained at a lower latency than many other forms of storage. In this way, the log messages can be, for example, quickly queried and analyzed to determine a root cause of a current/developing error or other problem in the computing cluster 100. Additionally, maintaining the log history 310 in the distributed memory 130 permits analysis of the log history 310 to generate various heuristics, histograms, reports, and other information about a current state of the computing cluster 100.

For example, in one embodiment, access to the distributed memory 130 is provided through various application program interfaces (APIs) that permit programs and/or users to execute processes against the log history 310 to generate additional data (e.g., reports). In this way, maintaining the log history 310 in the distributed memory 130 facilitates analysis of the computing cluster 100 and errors, failures, and other issues in the computing cluster 100.

At 560, one or more messages are evicted from the log history 310 in the distributed memory 130. In general, messages are evicted from the log history 310 upon a time limit (e.g., hours or days old) for the one or more messages expiring and/or when the log history 310 reaches a certain size (e.g., >10 gigabytes). In this way, only the most recent log messages are kept in the distributed memory 130 while older log messages are stored in a persistent memory as previously discussed in relation to block 460.

Figure 6:
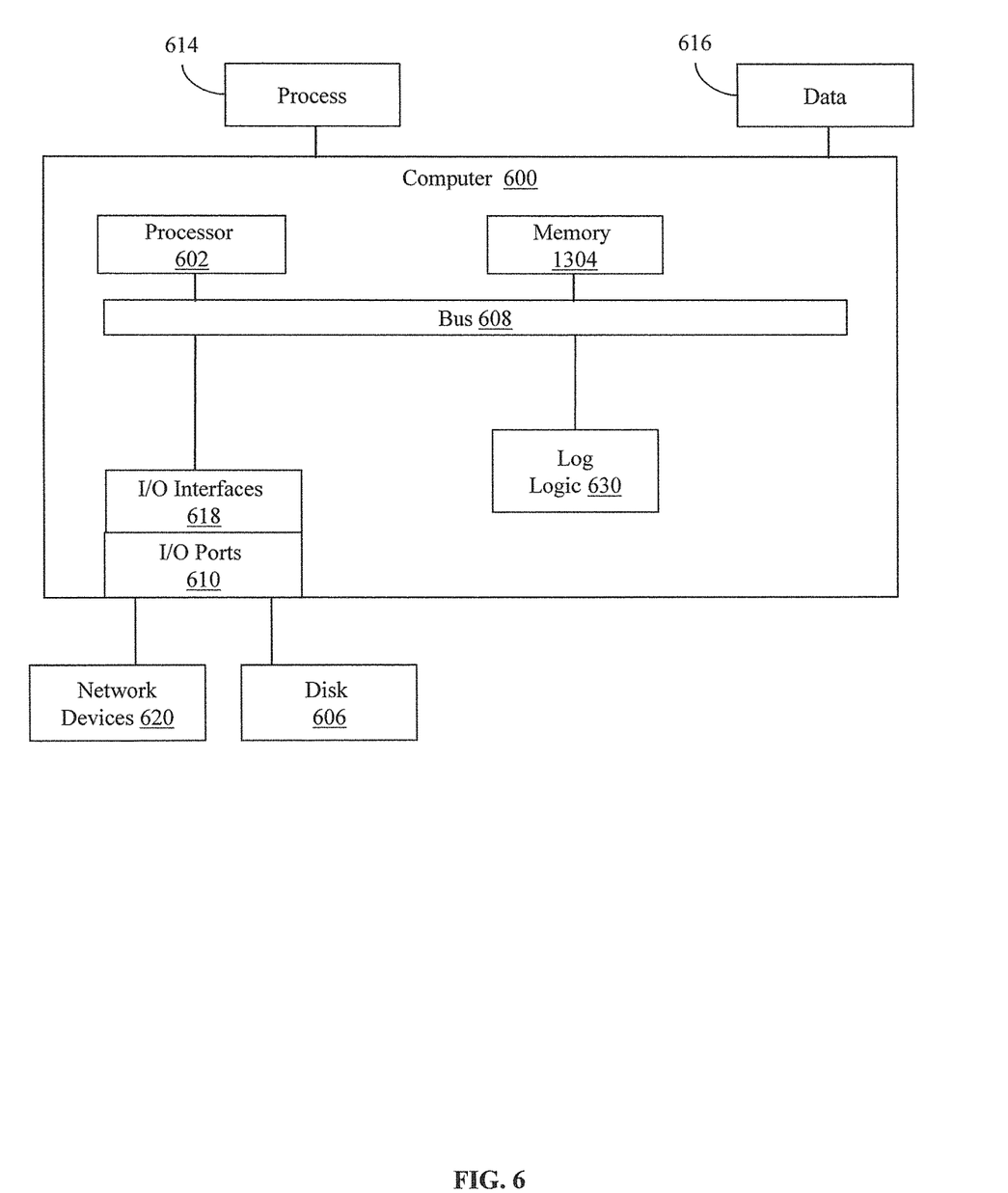
FIG. 6 illustrates an embodiment of a computing system configured with the example systems and methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include log logic 630 configured to facilitate storing log messages in a distributed memory similar to logging system 300 shown in FIG. 3. In different examples, the logic 630 may be implemented in hardware, a non-transitory computer-storage medium with stored instructions, firmware, and/or combinations thereof. While the logic 630 is illustrated as a hardware component attached to the bus 608, it is to be appreciated that in one example, the logic 630 could be implemented in the processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-storage medium", as used herein, is a non-transitory medium that stores instructions and/or data. A computer-storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

What is claimed is:

1. A non-transitory computer-storage medium storing computer-executable instructions that when executed by a computer cause the computer to perform at least:
   defining a distributed memory to include a plurality of memories associated with a first set of computing devices;
   storing, in one or more of the plurality of memories that are part of the distributed memory, log messages as a batch of log messages received via network communications from a plurality of handlers associated with a second set of computing devices;
   wherein the distributed memory is a separate component from the plurality of handlers;
   generating a formal log for combining the log messages from the plurality of memories in the distributed memory from the first set of computing devices;
   accessing, via network connections, the plurality of memories that are identified from the defined distributed memory and collecting the log messages stored on each of the plurality of memories;
   after a defined period of time has elapsed for receiving a group of batches of log messages from the plurality of handlers, adding into the formal log the log messages collected from the distributed memory associated with the first set of computing devices;
   appending the formal log to a log history that includes one or more previously stored formal logs; and
   registering a handler as part of the plurality of handlers by providing configuration information to the handler in response to a request from the handler to join a distributed logging system, wherein the plurality of handlers are part of the second set of computing devices that dynamically registers and deregisters components as a current processing load changes.

2. The non-transitory computer-storage medium of claim 1, wherein prior to storing the log messages in the distributed memory, transmitting a batch of the log messages from one or more handlers of the plurality of handlers to an associated memory from the plurality of memories in the distributed memory.

3. The non-transitory computer-storage medium of claim 1, further comprising instructions for:
tracking each of the plurality of handlers by monitoring when each batch of log messages in the group of batches arrives in the distributed memory, wherein each batch of the group of batches functions as a heartbeat communication that is provided to the distributed memory at a regular interval from one of the plurality of handlers to indicate that an associated handler is operating.

4. The non-transitory computer-storage medium of claim 1, further comprising instructions for:
modifying the distributed memory to change a size of the distributed memory by expanding the distributed memory to include memory from additional hosts, and
wherein storing the group of batches in the distributed memory avoids bottlenecks associated with storing the group of batches in a memory of a single device.

5. The non-transitory computer-storage medium of claim 1, further comprising instructions for: writing the formal log to a persistent memory after the formal log has been generated, wherein the formal log is generated after the defined period of time to account for time skews in receiving batches in the group of batches.

6. The non-transitory computer-storage medium of claim 1, further comprising instructions for:
sorting the log messages in the group of batches and assigning unique identifiers to the log messages according to a universal timestamp associated with each of the log messages in the group of batches,
wherein sorting the log messages uses the unique identifiers to provide ordering to the log messages that correlate related log messages and permit identifying a root cause of a reported condition from correlations between the sorted log messages; and
maintaining the formal log in the distributed memory to provide access to the log messages in a sorted format.

7. The non-transitory computer-storage medium of claim 1, further comprising instructions for:
evicting one or more messages from the log history in the distributed memory upon a time limit for the one or more messages expiring; and
providing access to the log history in the distributed memory to permit analyzing the formal log.

8. The non-transitory computer-storage medium of claim 1, wherein the defined period of time spans multiple heartbeat communications from each of the plurality of handlers, wherein each of the multiple heartbeat communications includes a batch of log messages, and wherein a handler of the plurality of handlers provides an empty batch as a heartbeat communication when no log messages have been collected by the handler.

9. A computer-implemented method, the method comprising:
defining a distributed memory to include a plurality of memories associated with a first set of computing devices;
storing, in one or more of the plurality of memories that are part of the distributed memory, log messages as a batch of log messages received via network communications from a plurality of handlers associated with a second set of computing devices;
wherein the distributed memory is a separate component from the plurality of handlers;
generating a formal log for combining the log messages from the plurality of memories in the distributed memory from the first set of computing devices;
accessing, via network connections, the plurality of memories that are identified from the defined distributed memory and collecting the log messages stored on each of the plurality of memories;
after a defined period of time has elapsed for receiving a group of batches of log messages from the plurality of handlers, adding into the formal log the log messages collected from the distributed memory associated with the first set of computing devices; and
appending the formal log to a log history that includes one or more previously stored formal logs.

10. The computer-implemented method of claim 9, wherein prior to storing the log messages in the distributed memory, transmitting a batch of the log messages from one or more handlers of the plurality of handlers to an associated memory from the plurality of memories in the distributed memory.

11. The computer-implemented method of claim 9, further comprising:
tracking each of the plurality of handlers by monitoring when each batch of log messages in the group of batches arrives in the distributed memory, wherein each batch of the group of batches functions as a heartbeat communication that is provided to the distributed memory at a regular interval from one of the plurality of handlers to indicate that an associated handler is operating.

12. The computer-implemented method of claim 9, further comprising:
modifying the distributed memory to change a size of the distributed memory by adding, to the defined distributed memory, a memory from an additional computing device, and
wherein storing the group of batches in the distributed memory avoids bottlenecks associated with storing the group of batches in a memory of a single device.

* * * * *